United States Patent
Schwenke et al.

(10) Patent No.: US 9,022,002 B2
(45) Date of Patent: May 5, 2015

(54) METHOD OF COLD STARTING AN INTERNAL COMBUSTION ENGINE IN HYBRID APPLICATIONS

(75) Inventors: R Travis Schwenke, Springboro, OH (US); Todd D. Brandel, Mears, MI (US); Poh Fong Chin, Novi, MI (US)

(73) Assignee: GM Global Technology Operations LLC, Detroit, MI (US)

(*) Notice: Subject to any disclaimer, the term of this patent is extended or adjusted under 35 U.S.C. 154(b) by 516 days.

(21) Appl. No.: 13/517,687

(22) Filed: Jun. 14, 2012

(65) Prior Publication Data

US 2013/0333655 A1  Dec. 19, 2013

(51) Int. Cl.
*F02N 11/08* (2006.01)
*F02N 15/00* (2006.01)
*B60W 10/06* (2006.01)
*B60W 20/00* (2006.01)

(52) U.S. Cl.
CPC .............. *F02N 15/00* (2013.01); *F02N 11/0814* (2013.01); *F02N 11/0848* (2013.01); *F02N 2200/023* (2013.01); *F02N 2200/061* (2013.01); *F02N 2300/102* (2013.01); *B60W 10/06* (2013.01); *B60W 2710/0644* (2013.01); *B60W 20/10* (2013.01)

(58) Field of Classification Search
CPC .................. F02N 2300/102; F02N 2300/2002; F02N 2200/023; F02N 2200/024; F02N 2200/061; F02N 2200/064; F02N 11/04; F02N 11/08; F02N 11/0803; F02N 11/0814; F02N 11/0818; F02N 11/0829; F02N 11/0848
USPC .......... 123/179.3, 179.4; 701/113; 290/18, 19, 290/21, 22, 25, 27; 180/65.285
See application file for complete search history.

(56) References Cited

U.S. PATENT DOCUMENTS

| | | | |
|---|---|---|---|
| 6,240,890 B1* | 6/2001 | Abthoff et al. ............. | 123/179.3 |
| 8,157,035 B2* | 4/2012 | Whitney et al. .......... | 180/65.265 |
| 2004/0099234 A1* | 5/2004 | Tamai et al. ................ | 123/179.3 |
| 2005/0252474 A1* | 11/2005 | Sah et al. .................... | 123/179.3 |
| 2005/0279324 A1* | 12/2005 | Dolker ........................ | 123/352 |
| 2007/0028880 A1* | 2/2007 | Yuya et al. ................. | 123/179.3 |
| 2008/0264374 A1* | 10/2008 | Harris ......................... | 123/179.3 |
| 2008/0275624 A1* | 11/2008 | Snyder ......................... | 701/104 |
| 2009/0183706 A1* | 7/2009 | Miwa et al. ................. | 123/179.3 |
| 2010/0179009 A1 | 7/2010 | Wittkopp et al. | |
| 2010/0318284 A1* | 12/2010 | Surnilla et al. ............... | 701/113 |

* cited by examiner

*Primary Examiner* — Erick Solis
*Assistant Examiner* — Anthony L Bacon

(57) ABSTRACT

A method to start operation of an internal combustion engine of a hybrid powertrain includes initiating rotation of a crankshaft of the engine with at least one electric machine in accordance with a first ramping profile until a first predetermined speed is achieved in response to an engine start event during a cold start condition. Engine speed is monitored and the engine is fired while controlling the engine speed to maintain the first predetermined speed with the at least one electric machine. The first ramping profile is adjusted at a rate corresponding to an estimated rate at which the engine speed is increasing during the engine firing. When at least one predetermined combustion quality parameter is achieved, the engine speed is controlled in accordance with a second ramping profile until a second predetermined speed is achieved based on controlling combustion parameters of the engine.

20 Claims, 5 Drawing Sheets

METHOD OF COLD STARTING AN INTERNAL COMBUSTION ENGINE IN HYBRID APPLICATIONS

TECHNICAL FIELD

This disclosure is related to start operation of an internal combustion engine within a hybrid powertrain.

BACKGROUND

The statements in this section merely provide background information related to the present disclosure. Accordingly, such statements are not intended to constitute an admission of prior art.

Electrically-variable transmissions typically have an input member connected to an engine and one or two electric machines capable of operating as motor/generators connected to different members of planetary gear sets to allow one or more electrically-variable modes of operation, fixed speed ratios, and an electric-only battery power mode.

It is known to utilize the one or two electric machines to provide torque to the engine for spinning the engine for starting the engine. It is further known to control the rotational speed of the crankshaft of the engine with the one or two electric machines during engine firing. Batteries known for supplying power to the one or two electric machines during engine starting can experience increases in battery performance requirements, such as charging and discharging spikes, that may exceed battery performance limits and possibly subject the battery to damage.

SUMMARY

A hybrid powertrain includes an internal combustion engine, an electrical energy storage device, an electro-mechanical transmission including at least one electric machine rotatably coupled to the engine. The electro-mechanical transmission is selectively controllably operative to transmit torque among the engine and the at least one electric machine. A method to start operation of the engine includes initiating rotation of a crankshaft of the engine with the at least one electric machine in accordance with a first ramping profile until a first predetermined speed is achieved in response to an engine start event during a cold start condition. Engine speed is monitored and the engine is fired while controlling the engine speed to maintain the first predetermined speed with the at least one electric machine. The first ramping profile is adjusted at a rate corresponding to an estimated rate at which the engine speed is increasing during the engine firing. When the at least one predetermined combustion quality parameter is achieved, engine speed is controlled in accordance with a second ramping profile until a second predetermined speed is achieved based on controlling combustion parameters of the engine.

BRIEF DESCRIPTION OF THE DRAWINGS

One or more embodiments will now be described, by way of example, with reference to the accompanying drawings, in which.

DETAILED DESCRIPTION

Figure 1:
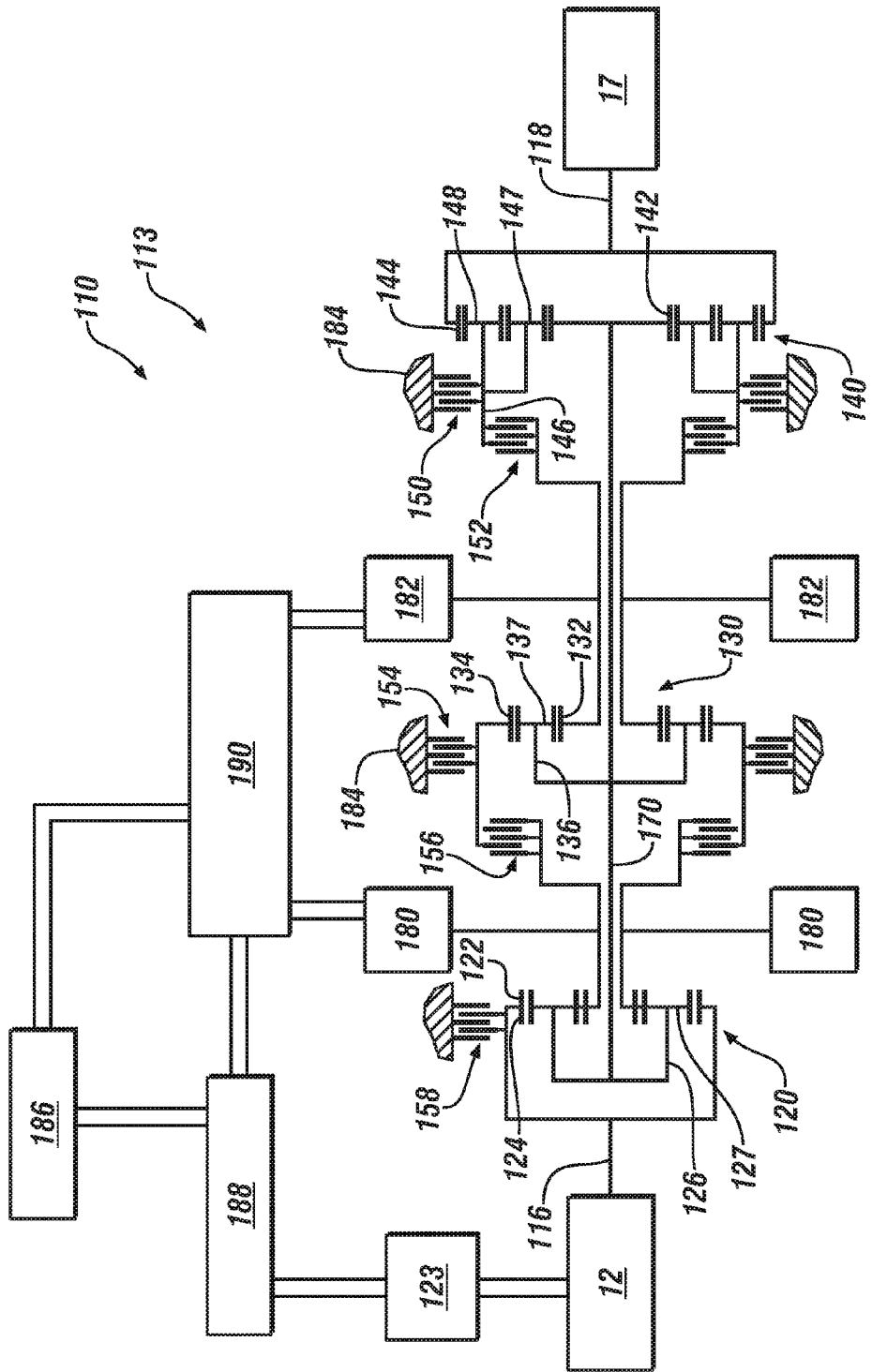
FIG. 1 illustrates an exemplary hybrid drive powertrain including an engine, transmission, energy storage device and control system, in accordance with the present disclosure.

Referring now to the drawings, wherein the showings are for the purpose of illustrating certain exemplary embodiments only and not for the purpose of limiting the same, referring to FIG. 1, a powertrain 110 is illustrated, providing a specific embodiment of a transmission 113. Powertrain 110 includes an engine 12, a final drive mechanism 17, and an electrically-variable transmission 113 with an input member 116 connected for rotation with the engine 12 and an output member 118 connected for rotation with the final drive mechanism 17. The transmission 113 includes three planetary gear sets 120, 130, and 140. The transmission 113 is designed to receive at least a portion of its driving power from the engine 12 in some of its operating modes, as discussed below. The electrically-variable transmission 113 includes two motor/generators (hereinafter electric machines) 180 and 182. As will become apparent, the electric machines 180,182 are selectively rotatably coupled to the engine 12 where the electro-mechanical transmission 113 may be selectively controllably operative to transmit torque among the engine 12 and the electric machines 180, 182.

The planetary gear set 120 includes a sun gear member 122 a ring gear member 124, and a carrier member 126. The carrier member 126 rotatably supports a plurality of pinion gears 127 that are disposed in meshing relationship with both the sun gear member 122 and the ring gear member 124. The planetary gear set 130 includes a sun gear member 132, a ring gear member 134, and a carrier member 136 that rotatably supports a plurality of pinion gears 137 that are disposed in meshing relationship with both the sun gear member 132 and the ring gear member 134. The planetary gear set 140 includes a sun gear member 142, a ring gear member 144, and a carrier member 146. The carrier member 146 rotatably supports a first set of pinion gears 147 as well as a second set of pinion gears 148. The first set of pinion gears 147 is disposed in meshing relationship with both the sun gear member 142 and the second set of pinion gears 148. The second set of pinion gears 148 is disposed in meshing relationship with the first set of pinion gears 147 and with the ring gear member 144. Thus, the planetary gear set 140 is a compound gear set, referred to herein as a S-P-P-R gear set.

An interconnecting member 170 continuously connects the carrier member 126, the carrier member 136, and the sun gear member 142. The interconnecting member 170 may alternatively be two separate components, one connecting the carrier members 126 and 136, and another connecting carrier member 136 with sun gear member 142.

The electric machine 180 (also referred to as M/G A) is continuously connected with the sun gear member 122. The input member 116 is connected for common rotation with the ring gear member 124. Another electric machine 182 (also referred to as M/G B) is connected for common rotation with the sun gear member 132. Ring gear member 144 is connected for common rotation with the output member 118. The electric machines 180, 182 each have a rotor that is rotatable and a stator that is continuously grounded to a stationary member, such as a casing of the transmission 113. As is discussed further below, the transmission 113 is configured such that the electric machines 180, 182 are subjected to a substantially equal maximum torque requirement that is required of each respective electric machine at some point during four forward electrically-variable modes. This allows the electric machines to have a substantially equal, minimal size. The electric machines 180,182 may receive electrical power from or provide electrical power to an energy storage device 186 such as a battery. A hybrid control module (HCP) 188 is in signal communication with the battery 186 and with a power inverter 190 that is also in electrical communication with the stator portions of the electric machines 180,182. The HCP 188 responds to a variety of input signals including vehicle speed, operator demand, the level at which the battery 186 is charged and the power being provided by the engine 12 to regulate the flow of power between the electric machines 180,182 and the battery 186 via the inverter 190, which converts between direct current provided or utilized by the battery 186 and alternating current provided or utilized by the stator portions of the electric machines 180,182. The HCP 188 has supervisory control over an engine control module (ECM) 123 configured to monitor inputs from sensors to determine states of engine parameters. The ECM 123 can further be configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled with reduced motor interaction during cold starts based on controlling combustion parameters including airflow torque and spark induced torque.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation.

The electrically-variable transmission 113 also includes a plurality of torque-transmitting mechanisms C1 150, C2 152, C3 154, C4 156 and C5 158. Torque-transmitting mechanism 150, a stationary clutch, also referred to as a brake, is selectively engagable to ground the carrier member 146 to a stationary member 184. Torque-transmitting mechanism 152, a rotating clutch, is selectively engagable to connect sun gear member 132 and electric machine 182 for common rotation with carrier member 146. Torque-transmitting mechanism 154, a stationary clutch, is selectively engagable to ground the ring gear member 134 to the stationary member 184. Torque-transmitting mechanism 156, a rotating clutch, is selectively engagable to connect the electric machine 180 and the ring gear member 134 for common rotation. Torque-transmitting mechanism 158, a stationary clutch, is selectively engagable to connect and ground the ring gear member 124 to the stationary member 184. Torque-transmitting mechanism 158 can be optionally included when the electro-mechanical transmission 113 is configured for rear-wheel drive operation.

If the torque-transmitting mechanism 150 is engaged, carrier member 146 is a reaction member within the planetary gear set 140, and power transferred via the interconnecting member 170 will be transmitted through the sun gear member 142 to the ring gear member 144 and therefore to the output member 118. When the torque-transmitting mechanism 152 is engaged, the electric machine 182 receives power from or delivers power to carrier member 146 as well as the sun gear member 132. When the torque-transmitting mechanism 154 is engaged, ring gear member 134 is held stationary and becomes a reaction member within the planetary gear set 130. When the torque-transmitting mechanism 156 is engaged, the electric machine 180 is connected for rotation with the ring gear member 134, and either receives or accepts power through the ring gear member 134 as well as the sun gear member 122. When torque-transmitting transmitting mechanism 158 is engaged, ring gear member 124 is held stationary and becomes a reaction member within the planetary gear set 120, such that the speed of the input member 116 is locked-up.

The exemplary hybrid powertrain 110 is operative in several operating modes, including four forward electrically-variable modes, described with reference to Table 1, below.

TABLE 1

| Transmission Operating Range state | Applied Clutches | | | | |
|---|---|---|---|---|---|
| | C4 156 | C3 154 | C2 152 | C1 150 | C5 158 |
| Neutral 1 | | | | | X* |
| ETC Mode 1 | | | | X | X* |
| ETC Mode 2 | | | X | | X* |
| ETC Mode 12 | | | X | X | |
| Neutral 2 | | X | | | X* |
| EVT Mode 1 | | X | | X | |
| EVT Mode 4 | | X | X | | |
| Neutral 3 | X | | | | |
| EVT Mode 2 | X | | | X | |
| EVT Mode 3 | X | | X | | |
| Fixed Gear 2 | X | | X | X | |
| Neutral 4 | X | X | | | |
| Fixed Gear 1 | X | X | | X | |
| Fixed Gear 3 | X | X | X | | |

The exemplary hybrid drive powertrain of FIG. 1 can utilize various combinations of engine 12 and motors 180 and 182 to provide torque to the powertrain 110. The exemplary hybrid powertrain 110 can be described as a four mode hybrid, wherein four electrically-variable gear modes or states (EVT Mode 1, EVT Mode 2, EVT Mode 3 and EVT Mode 4) are possible. That is, engagement of torque-transmitting mechanisms 150 and 154 establish a first forward electrically-variable mode (EVT Mode 1), engagement of torque-transmitting mechanisms 150 and 156 establish a second forward electrically-variable mode (EVT Mode 2), engagement of torque-transmitting mechanisms 152 and 156 establish a third forward electrically-variable mode (EVT Mode 3) and engagement of torque-transmitting mechanisms 152 and 154 establish a fourth forward electrically-variable mode (EVT Mode 4). Engagement of torque transmitting mechanism 158 in addition to each set of torque transmitting mechanisms that establish the electrically-variable modes discussed above, provides lock-up of the input shaft 116 and grounds the engine 12. Therefore, when torque-transmitting mechanisms 158 is additionally engaged in each of the electrically variable modes (EVT Modes 1-4), electrical vehicle (EV) modes are formed. The transmission 113 also provides three fixed ratio modes of operation. A first fixed ratio mode is provided by engaging torque-transmitting mechanisms 150, 154 and 156, preferably at the mechanical point established between the first and second forward electrically-variable modes. A second fixed ratio mode is established by engaging torque-transmitting mechanisms 150, 152 and 156, preferably at the mechanical point established between the second and third electrically-variable modes. A third fixed ratio mode is established by engaging torque-transmitting mechanisms 152, 154 and 156.

Electric torque converter modes (ETC Mode 1, ETC Mode 2 and ETC Mode 12) allow electric output of electric machine 180 and/or electric machine 182 to be adapted to control the transfer of torque from the engine 12 through the transmission differential gearing to the output member 118. ETC Mode 1 is established by engaging torque-transmitting mechanism 150. In ETC Mode 1, electric machine 180 reacts the engine 12 with the first and third planetary gear sets 120 and 140, respectively, and electric machine 182 freewheels. ETC Mode 2 is provided by engagement of the torque-transmitting mechanism C2 152 and disengaging the remaining torque-transmitting mechanisms. In ETC Mode 2, electric machine 180 reacts the engine 12 with the with the first and third planetary gear sets 120 and 140, respectively, while electric machine 182 reacts the engine 12 and electric machine 180 to the output member 118. ETC Mode 12 is provided by engagement of the torque-transmitting mechanisms C1 150 and C2 152. When the electro-mechanical transmission is configured for front-wheel drive operation, a vehicle can be started during a cold start condition in ETC Modes 1 and 2 by selectively engaging the torque-transmitting mechanism C5 158, in addition to engagement of the respective torque-transmission mechanism C1 150 or C2 152. In an exemplary embodiment, and discussed in greater detail below, an engine start event during a cold-start condition in ETC Mode 1 (engagement of torque-transmitting mechanisms C1 150 and C5 158) is illustrated in plot 400 of FIG. 4.

Neutral operating modes are provided by disengagement of all the torque-transmitting mechanisms (i.e., Neutral 1), engagement of the torque-transmitting mechanisms C3 154 alone (i.e., Neutral 2), engagement of the torque-transmitting mechanisms C4 156 alone (i.e., Neutral 3) and engagement of the torque-transmitting mechanisms C3 154 and C4 156 (i.e., Neutral 4).

As will become apparent, the engine 12 can be started, including during cold start conditions, while minimizing the amount of power into the ESD 190 and the amount of power out of the ESD 190 utilizing adjustable ramping profiles during engine cranking. When the transmission is configured for rear-wheel drive operation, the engine 12 can be started, including during a cold start condition, in any of Neutral modes 1 and 2, ETC Modes 1 and 2 and EVT Modes 1 and 4 with the additional selective engagement of the torque-transmitting mechanism C5 158. Engagement of the torque-transmitting mechanism C5 158 during the cold start condition is denoted by an X* in table 1. Engagement of the torque-transmitting mechanism C5 158 forbids rotation of the ring gear 124 of the first planetary gear set 120 coupled to the crankshaft of the engine 12 via the input shaft 116.

When the transmission is configured for rear-wheel drive operation, the engine 12 can be started during a cold start condition in either of Neutral modes 2 and 4. It will be appreciated that the torque-transmitting mechanism C5 158 is never engaged during any start events during a cold star condition when the transmission 113 is configured for rear-wheel drive operation, and thus, grounding of the ring gear 124 is always forbidden. When torque-transmitting mechanisms C3 154 and C4 156 are engaged, electric machine 182 may provide torque to the engine for initiating rotation of the crankshaft of the engine and controlling engine speed during engine firing while electric machine 180 is grounded. When only torque-transmitting mechanism C3 154 is engaged, both electric machines 180 and 182 may provide torque to the engine for initiating rotation of the crankshaft of the engine and controlling engine speed during engine firing.

Figure 2:
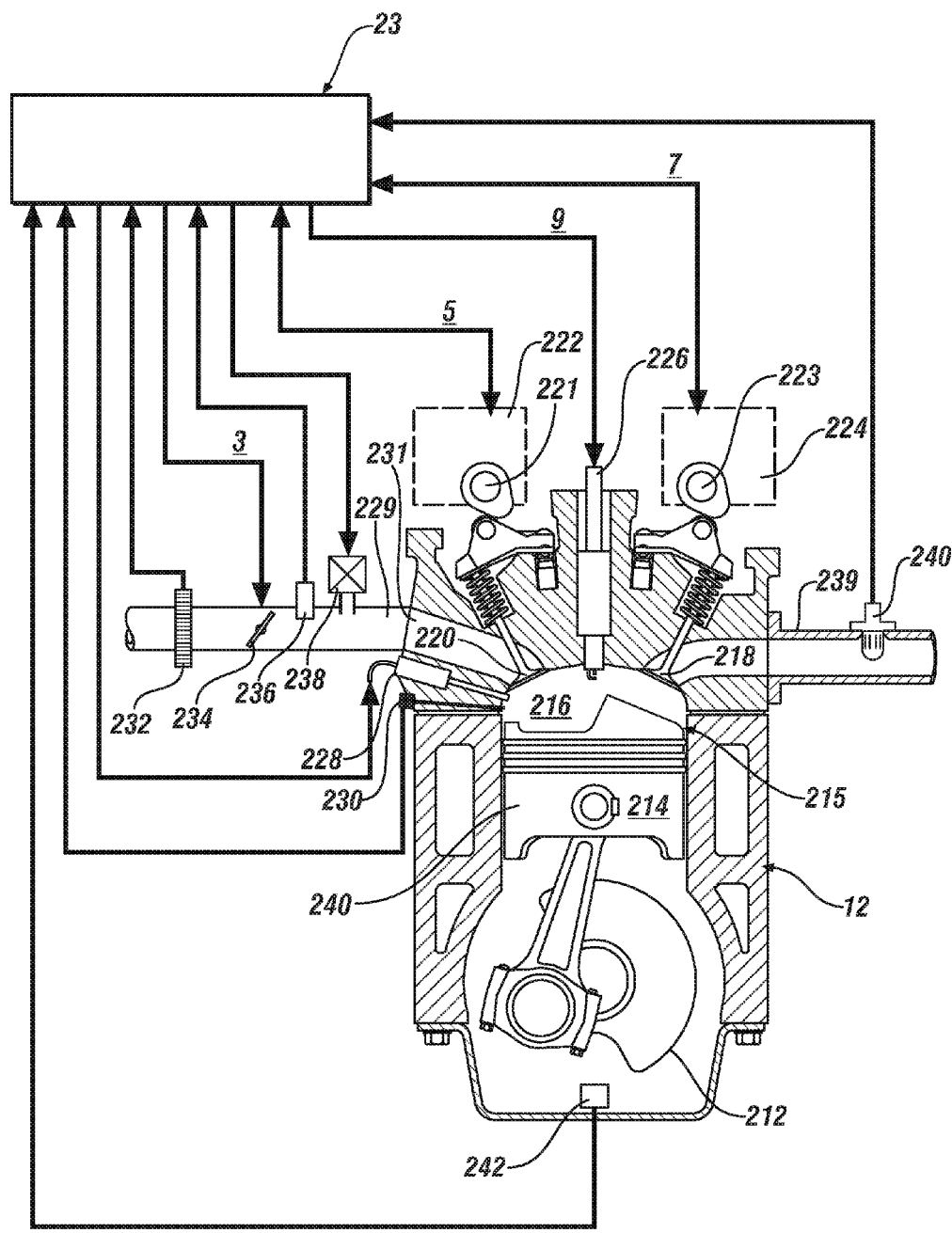
FIG. 2 illustrates an internal combustion engine and an accompanying engine control module, in accordance with the present disclosure.

In accordance with an exemplary embodiment of the present disclosure, FIG. 2 schematically shows the exemplary internal combustion engine 12 and an ECM 23 that have been constructed in accordance with an embodiment of the present disclosure. The disclosure is only exemplary and may be applied to various internal combustion engine systems and combustion cycles including conventional gasoline engines, compression ignition engines, diesel engines and engines selectively operative in a controlled auto-ignition (HCCI) combustion mode and a homogeneous spark-ignition (SI) combustion mode.

The exemplary engine 12 includes a multi-cylinder internal combustion engine having reciprocating pistons 214 slidably movable in cylinders 215 which define variable volume combustion chambers 216. Each piston 214 is connected to a rotating crankshaft 212 by which linear reciprocating motion is translated to rotational motion. An air intake system provides intake air to an intake manifold 229 which directs and distributes air into intake runners 231 of the combustion chambers 216. The air intake system includes airflow ductwork and devices for monitoring and controlling the airflow. The air intake devices preferably include a mass airflow sensor 232 for monitoring mass airflow and intake air temperature. A main throttle valve 234 preferably includes an electronically controlled butterfly valve that is used to controllably restrict airflow into the intake manifold 229 in response to a control signal 3 from the ECM 23. From the intake manifold 229, intake airflow is controllably restricted to individual cylinders by respective flow control devices located proximate to each individual cylinder. A pressure sensor 236 in the intake manifold 229 is configured to monitor manifold absolute pressure and barometric pressure. An external flow passage recirculates exhaust gases from engine exhaust to the intake manifold 229, having a flow control valve referred to as an exhaust gas recirculation (EGR) valve 238. The ECM 23 is operative to control mass flow of exhaust gas to the intake manifold 229 by controlling opening of the EGR valve 238.

Airflow from the intake manifold 229 into the combustion chamber 216 is controlled by one or more intake valve(s) 220. Exhaust flow out of the combustion chamber 216 is controlled by one or more exhaust valve(s) 218 to an exhaust manifold 239. The engine 12 is equipped with systems to control and adjust openings and closings of the intake and exhaust valves 220 and 218, respectively. In one embodiment, the openings and closings of the intake and exhaust valves 220 and 218 may be controlled and adjusted by controlling intake and exhaust variable cam phasing/variable lift control (VCP/

VLC) devices 222 and 224, respectively. The intake and exhaust VCP/VLC devices 222 and 224 are configured to control and operate an intake camshaft 221 and an exhaust camshaft 223, respectively. The rotations of the intake and exhaust camshafts 221 and 223 are linked to and indexed to rotation of the crankshaft 212, thus linking openings and closings of the intake and exhaust valves 220 and 218 to positions of the crankshaft 212 and the pistons 214.

The intake VCP/VLC device 222 preferably includes a mechanism operative to switch and control valve lift of the intake valve(s) 220 and variably adjust and control phasing of the intake camshaft 221 for each cylinder 215 in response to a control signal 5 from the ECM 23. The exhaust VCP/VLC device 224 preferably includes a controllable mechanism operative to variably switch and control valve lift of the exhaust valve(s) 218 and variably adjust and control phasing of the exhaust camshaft 223 for each cylinder 215 in response to a control signal 7 from the ECM 23.

The intake and exhaust VCP/VLC devices 222 and 224 can each include a controllable two-step variable lift control (VLC) mechanism operative to control magnitude of valve lift, or opening, of the intake and exhaust valve(s) 220 and 218, respectively, to one of two discrete steps. The two discrete steps preferably include a low-lift valve open position (about 4-6 mm in one embodiment) preferably for load speed, low load operation, and a high-lift valve open position (about 8-13 mm in one embodiment) preferably for high speed and high load operation. The intake and exhaust VCP/VLC devices 222 and 224 each preferably includes a variable cam phasing (VCP) mechanism to control and adjust phasing (i.e., relative timing) of opening and closing of the intake valve(s) 220 and the exhaust valve(s) 218 respectively. Adjusting the phasing refers to shifting opening times of the intake and exhaust valve(s) 220 and 218 relative to positions of the crankshaft 212 and the piston 214 in the respective cylinder 215. The VCP mechanisms of the intake and exhaust VCP/VLC devices 222 and 224 each preferably has a range of phasing authority of about 60°-90° of crank rotation, thus permitting the ECM 23 to advance or retard opening and closing of one of intake and exhaust valve(s) 220 and 218 relative to position of the piston 214 for each cylinder 215. The range of phasing authority is defined and limited by the intake and exhaust VCP/VLC devices 222 and 224. The intake and exhaust VCP/VLC devices 222 and 224 include camshaft position sensors to determine rotational positions of the intake and the exhaust camshafts 221 and 223. The VCP/VLC devices 222 and 224 are actuated using one of electro-hydraulic, hydraulic, and electric control force, controlled by the ECM 23.

The engine 12 includes a fuel injection system, including a plurality of high-pressure fuel injectors 228 each configured to directly inject a mass of fuel into one of the combustion chambers 216 in response to a signal from the ECM 23. The fuel injectors 228 are supplied pressurized fuel from a fuel distribution system.

The engine 12 includes a spark-ignition system by which spark energy may be provided to a spark plug 226 for igniting or assisting in igniting cylinder charges in each of the combustion chambers 216 in response to a signal 9 from the ECM 23.

The engine 12 is equipped with various sensing devices for monitoring engine operation, including a crank sensor 242 having output RPM and operative to monitor crankshaft rotational position, i.e., crank angle and engine speed, wherein engine speed is effectively equal to the input speed $N_I$ of the input shaft 116. For simplicity, engine speed and rotational speed of the crankshaft 212 as measured by the crank sensor 242, will be referred to as $N_I$. In one embodiment, a combustion sensor 230 is configured to monitor combustion, and an exhaust gas sensor 240 is configured to monitor exhaust gases, typically an air/fuel ratio sensor. The combustion sensor 230 includes a sensor device operative to monitor a state of a combustion parameter and is depicted as a cylinder pressure sensor operative to monitor in-cylinder combustion pressure. The output of the combustion sensor 230 and the crank sensor 242 are monitored by the ECM 23 which determines combustion phasing, i.e., timing of combustion pressure relative to the crank angle of the crankshaft 212 for each cylinder 215 for each combustion cycle. The combustion sensor 30 may also be monitored by the ECM 23 to determine a mean-effective-pressure (IMEP) for each cylinder 215 for each combustion cycle. Preferably, the engine 12 and the ECM 23 are mechanized to monitor and determine states of IMEP for each of the engine cylinders 215 during each cylinder firing event. Alternatively, other sensing systems may be used to monitor states of other combustion parameters within the scope of the disclosure, e.g., ion-sense ignition systems, and non-intrusive cylinder pressure sensors.

In operation, the ECM 23 monitors inputs from the aforementioned sensors to determine states of engine parameters. The ECM 23 is configured to receive input signals from an operator (e.g., via a throttle pedal and a brake pedal) to determine an operator torque request. The ECM 23 monitors the sensors indicating the $N_I$ and intake air temperature, and coolant temperature and other ambient conditions.

The ECM 23 executes algorithmic code stored therein to control the aforementioned actuators to form the cylinder charge, including controlling combustion parameters that include intake mass airflow that can be utilized to control airflow torque, spark-ignition timing that can be utilized to control spark induced torque, injected fuel mass, fuel injection timing, EGR valve position to control flow of recirculated exhaust gases, and intake and/or exhaust valve timing and phasing on engines so equipped. Valve timing and phasing may include NVO and lift of exhaust valve reopening (in an exhaust re-breathing strategy) in one embodiment. The ECM 23 may operate to turn the engine 12 on and off during ongoing vehicle operation, and may operate to selectively deactivate a portion of the combustion chambers 216 or a portion of the intake and exhaust valves 220 and 218 through control of fuel and spark and valve deactivation. The ECM 23 may control an air/fuel ratio based upon feedback from the exhaust gas sensor 240.

As will become apparent, the ECM 123 (i.e., ECM 23) and the HCP 188 shown in FIG. 1 can be used in association with one another to minimize power flow into the ESD 190 and out of the ESD 190 by controlling engine speed with the at least one electric machine 180 and/or 182 during engine firing, and after at least one predetermined combustion quality parameter is achieved, controlling the engine speed to achieve a desired idle speed based on controlling combustion parameters of the engine. When a combustion quality parameter is achieved, there is a strong indication that the engine 12 has begun robust combustion. The combustion quality parameters can include at least one of a monitored engine speed, a monitored engine torque and monitored power flow into and out of the ESD 190 achieving respective thresholds.

Figure 3:
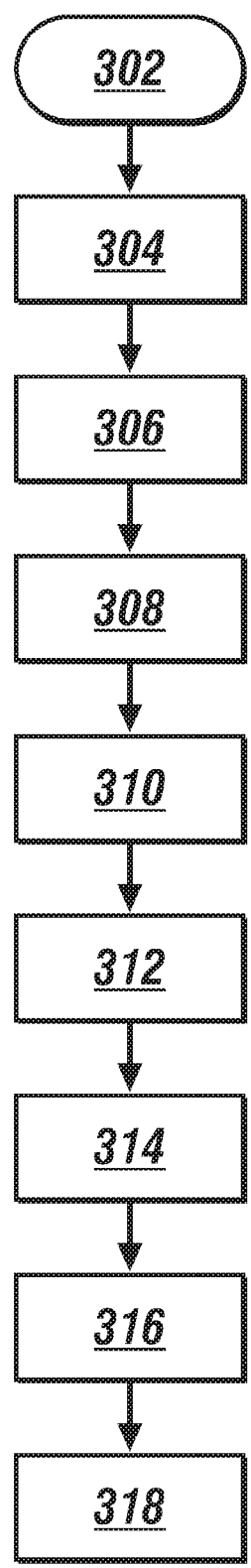
FIG. 3 illustrates a flowchart for performing an engine start event, in accordance with the present disclosure.

In an exemplary embodiment of the present disclosure, with continued reference to FIGS. 1 and 2, FIG. 3 illustrates an exemplary flowchart for starting an internal combustion engine of a hybrid powertrain. In the exemplary embodiment, starting the internal combustion engine of the hybrid system can occur during a cold start condition. The cold start condition of the engine includes an engine start event when at least one of an engine coolant temperature is below a predetermined engine coolant temperature and an energy storage device temperature is below a predetermined energy storage device temperature. The cold start condition can also include an engine start event when an energy storage device state (ESD) of charge (SOC) is below a predetermined SOC. The engine start event can be in response to an operator engine start request or an engine autostart event. In the exemplary embodiment, the ESD is a lithium ion battery, having a narrow operating range. Reducing battery power required to start the internal combustion engine during the cold start condition can improve the ability to start the internal combustion engine when the battery has a low SOC. Minimizing battery performance requirements, such power flow into and out of the ESD during the cold start condition, can reduce damage to the battery costs associated with operation of the battery.

Engine flares, including speed and/or torque flares, can occur due to inaccuracy in an engine torque model once the engine begins firing. The engine speed flares can result in the engine speed exceeding a predetermined ramping profile and/or predetermined crankshaft speed desired by the hybrid system during engine start events once engine firing is initiated. Decelerating the engine to maintain or hold the engine speed at the predetermined ramping profile can result in undesired values of noise, vibrations and harmonics (NVH) within the hybrid system. Additionally, engine misfires can occur while decelerating the engine to maintain the engine speed at the predetermined ramping profile and/or predetermined crankshaft speed because combustion within the engine may not yet be stable. Further, increased power flow into the energy storage device (i.e., charging) is required to maintain or hold the engine speed at the predetermined ramping profile and predetermined crankshaft speed desired by the hybrid system during engine firing. To minimize the negative implications associated with maintaining or holding the engine speed at the predetermined ramping profile and predetermined crankshaft speed desired by the hybrid system during engine firing, the present disclosure adjusts the predetermined ramping profile to a rate corresponding to an estimated rate at which the engine speed is increasing due to combustion during the engine firing.

Table 2 is provided as a key to FIG. 3 wherein the numerically labeled blocks and the corresponding functions are set forth as follows.

TABLE 2

| BLOCK | BLOCK CONTENTS |
| --- | --- |
| 302 | Detecting engine start event. |
| 304 | Selectively grounding an element of a planetary gear set rotatably coupled to the crankshaft of the engine. |
| 306 | Initiating rotation of a crankshaft of the engine with at least one electric machine in accordance with a first ramping profile until a first predetermined speed is achieved. |
| 308 | Firing the engine while controlling the engine speed to maintain the first predetermined speed with the at least one electric machine. |
| 310 | Adjusting the first ramping profile to a rate corresponding to an estimated rate at which the engine speed is increasing during the engine firing. |
| 312 | Determining a combustion quality parameter has been achieved. |
| 314 | Controlling engine speed in accordance with a second ramping profile until a second predetermined speed is achieved based on controlling combustion parameters of the engine. |
| 316 | Selectively un-grounding the element of a planetary gear set rotatably coupled to the crankshaft of the engine based on configuration of the powertrain. |
| 318 | End engine start event. |

Referring to block 302, an engine start event during a cold start condition can be detected when at least one of an engine coolant temperature is below a predetermined engine coolant temperature and an energy storage device temperature is below a predetermined energy storage device temperature. The cold start condition can also be detected when an energy storage device SOC is below a predetermined energy storage device SOC. The engine start event can include an operator engine start request such as a key-on to the ignition. Further, the engine start event can include an engine start event during ongoing operation of the hybrid powertrain. It will be appreciated that the exemplary start event can occur during any engine start event, and is therefore not limited to only cold start events. The terms "energy storage device" and "battery" may be used interchangeably.

Referring to block 304, an element of a planetary gear set rotatably coupled to the crankshaft of the engine is selectively grounded when a transmission is configured for front-wheel drive operation. Block 304 will be discussed in further detail with reference to an exemplary transmission 614 illustrated in FIG. 5.

However, in embodiments when the powertrain is configured for rear-wheel drive operation, the torque-transmitting mechanism C5 158 is never grounded, and is therefore, selectively ungrounded in immediately preceding block 306. Therefore, when the powertrain is configured for rear-wheel drive operation, grounding of the element of the planetary gear set (i.e., ring gear member 124) rotatably coupled to the crankshaft of the engine is forbidden until the controlled engine speed in accordance with the second ramping profile achieves the desired idle speed. Once the controlled engine speed achieves the desired idle speed, the start event is ended and the element of the planetary gear set may be either grounded (engagement of C5 158) or ungrounded (disengagement of C5 158) accordingly, based on shift execution of the transmission. It will therefore be appreciated that block 304 is not applied when powertrain 110 of FIG. 1 is utilized.

Referring to block 306, rotation of the crankshaft of the engine is initiated with the at least one electric machine 180 and/or 182 in accordance with a first ramping profile until a first predetermined speed is achieved. In an exemplary embodiment, the first predetermined speed may correspond to a desired crankshaft speed. The first predetermined speed may be selected to be of a sufficiently low engine speed (e.g., 180 RPM), indicative of non-hybrid applications utilizing conventional electric starter systems, to minimize power flow out of the energy storage device for spinning (e.g., initiating rotation of a crankshaft) of the engine. Accordingly, the first ramping profile is based on an operating range of the ESD defined by a lower SOC limit and an upper SOC limit. During the initiated rotation of the crankshaft of the engine with the at least one electric machine 180 and/or 182 until the first predetermined speed is achieved, the first ramping profile is constrained by the lower SOC limit so that the power flow out of the energy storage device (e.g., discharging) does not result in the SOC of the energy storage device discharging below the lower SOC limit. The engine can be simultaneously fueled during the initiating rotation of the crankshaft of the engine with the at least one electric machine 180 and/or 182.

Referring to block 308, the engine is fired while controlling the engine speed to maintain the first predetermined speed (i.e., desired crankshaft speed) with the at least one electric machine 180 and/or 182. The firing of the engine can be enabled once it is been determined that the engine speed has stabilized at the first predetermined speed. As aforementioned, engine flare conditions can occur due to inaccuracy in an engine torque model once the engine begins firing. The engine flare condition can include the engine speed increasing above the first predetermined speed (i.e., desired crankshaft speed) during the firing of the engine. The engine flare condition can further include the engine torque increasing above an engine torque flare threshold. In an exemplary embodiment, the first ramping profile is adjusted to a rate corresponding to an estimated rate at which the engine speed is increasing during the engine firing in response to the engine flare condition. Accordingly, the first predetermined speed (i.e., desired crankshaft speed) is incrementally increased at the same rate corresponding to the rate at which the engine speed is estimated to be increasing due to combustion during the engine firing.

Referring to block 310, the first ramping profile is adjusted to the rate corresponding to the estimated rate at which the engine speed is increasing during the engine firing. Likewise, the first predetermined speed (i.e., desired crankshaft speed) is incrementally increased at the same rate corresponding to the rate at which the engine speed is estimated to be increasing due to combustion during the engine firing. In an exemplary embodiment, the first ramping profile is adjusted only in response to the engine flare condition, such as the engine speed flaring above the first predetermined speed and/or the engine torque flaring above an engine torque flare threshold. The adjustment of the first ramping profile and incremental increase of the first predetermined engine speed enables the engine speed to increase due to the initial combustion events during the engine firing without restraint. Without the adjustment of the first ramping profile, engine speed would be restrained to the first ramping profile, and accordingly, the engine would be forced to decelerate to maintain and hold the first predetermined speed. Decelerating the engine speed further results in an undesirable power flow into the ESD 190 to maintain and hold the engine speed at the first predetermined speed. Further, decelerating the engine is undesirable because it can result in undesirable values of noise, vibrations and harmonics due to reversal in engine acceleration. Accordingly, the adjusted first ramping profile is constrained by the upper SOC limit of the energy storage device so that power flow into the ESD 190 (e.g., charging) is minimized and does not result in the SOC of the ESD 190 charging above lower SOC limit.

Until at least one predetermined combustion quality parameter is achieved, the first ramping profile can be continuously adjusted at the rate corresponding to the estimated rate at which the engine speed is increasing. However, the first ramping profile will not be further adjusted if further engine flare conditions no longer occur, e.g., the engine speed is below the predetermined engine speed, because it is desirable to have the engine accelerate as quickly as possible when the power flow into and out of the energy storage device exceeding the SOC upper and lower limits is not a factor.

Block 312 determines whether at least one predetermined combustion quality parameter has been achieved. When at least one predetermined combustion quality parameter has been achieved there is an indication that combustion is now stable. The predetermined combustion quality parameter can include the engine speed achieving a combustion quality speed threshold. The combustion quality speed threshold is greater than the first predetermined speed (i.e., desired crankshaft speed) and less than the second predetermined speed (i.e., desired idle speed). The predetermined combustion quality parameter can include the engine torque achieving a combustion quality torque threshold. The predetermined combustion quality parameter can further include power flow into and out of the ESD 190 achieving a power flow threshold. Therefore, the predetermined combustion quality parameter is selected from the group consisting of: the engine speed achieving the combustion quality speed threshold; the engine torque achieving the combustion quality torque threshold; and power flow into and out of the energy storage device achieving a power flow threshold.

Referring to block 314, when the at least one predetermined combustion quality parameter has been achieved in block 312, the engine speed is controlled in accordance with a second ramping profile until a second predetermined speed (i.e., a desired idle speed) is achieved based on controlling combustion parameters of the engine. In one embodiment, the controlled combustion parameters can include airflow torque and/or spark induced torque. However, this disclosure is not limited to controlled combustion parameters of only airflow torque and spark induced torque. Controlling combustion parameters of the engine to control the engine speed in accordance with the second ramping profile can minimize the requirement of power flow out of the ESD 190 to control the engine speed in accordance with the second ramping profile. Accordingly, the second ramping profile may be constrained by the upper SOC limit and the lower SOC charge limit of the energy storage device. In an exemplary embodiment, interaction from the at least one electric machine to the crankshaft of the engine can be reduced if the SOC of the energy storage device is near the lower SOC limit. In this instance, the second ramping profile may be shallow due to minimal or no contribution from the at least one electric machine in increasing the engine speed to the second predetermined speed (i.e., desired idle speed). In another exemplary embodiment, interaction from the at least one electric machine to the crankshaft of the engine can be maintained if the SOC of the energy storage device is near the upper SOC limit or not at risk of violating the lower SOC limit. In this instance, the second ramping profile may be steep due to maintained or increased interaction from the at least one electric machine to increase the engine speed to the second predetermined speed (i.e., desired idle speed).

Referring to block 316, when the powertrain is configured for front-wheel drive operation, the element of the planetary gear set rotatably coupled to the crankshaft of the engine can be selectively un-grounded, and thus, permitted to rotate when the second predetermined speed (i.e., desired idle speed) is achieved. Block 306 will be discussed in further detail with reference to an exemplary transmission 614 illustrated in FIG. 5.

In the embodiment when the powertrain 110 is configured for rear-wheel drive operation, the element of the planetary gear set rotatably coupled to the crankshaft of the engine can be selectively grounded. In other words, forbidding grounding of the element of the planetary gear set is no longer required once the second predetermined speed (i.e., desired idle speed) is achieved, and thus, the element of the planetary gear set may be grounded. Therefore, once the controlled engine speed achieves the desired idle speed, the start event is ended (i.e., block 318) and the element of the planetary gear set may be either grounded (engagement of C5 158) or ungrounded (disengagement C5158) accordingly, based on shift execution of the transmission.

Referring to block 318, the engine start event is ended because the engine speed has achieved the second predetermined speed (i.e., desired idle speed). Accordingly, shift execution of the engine can be enabled according to one of the transmission operating range states illustrated in Table 1.

Figure 4:
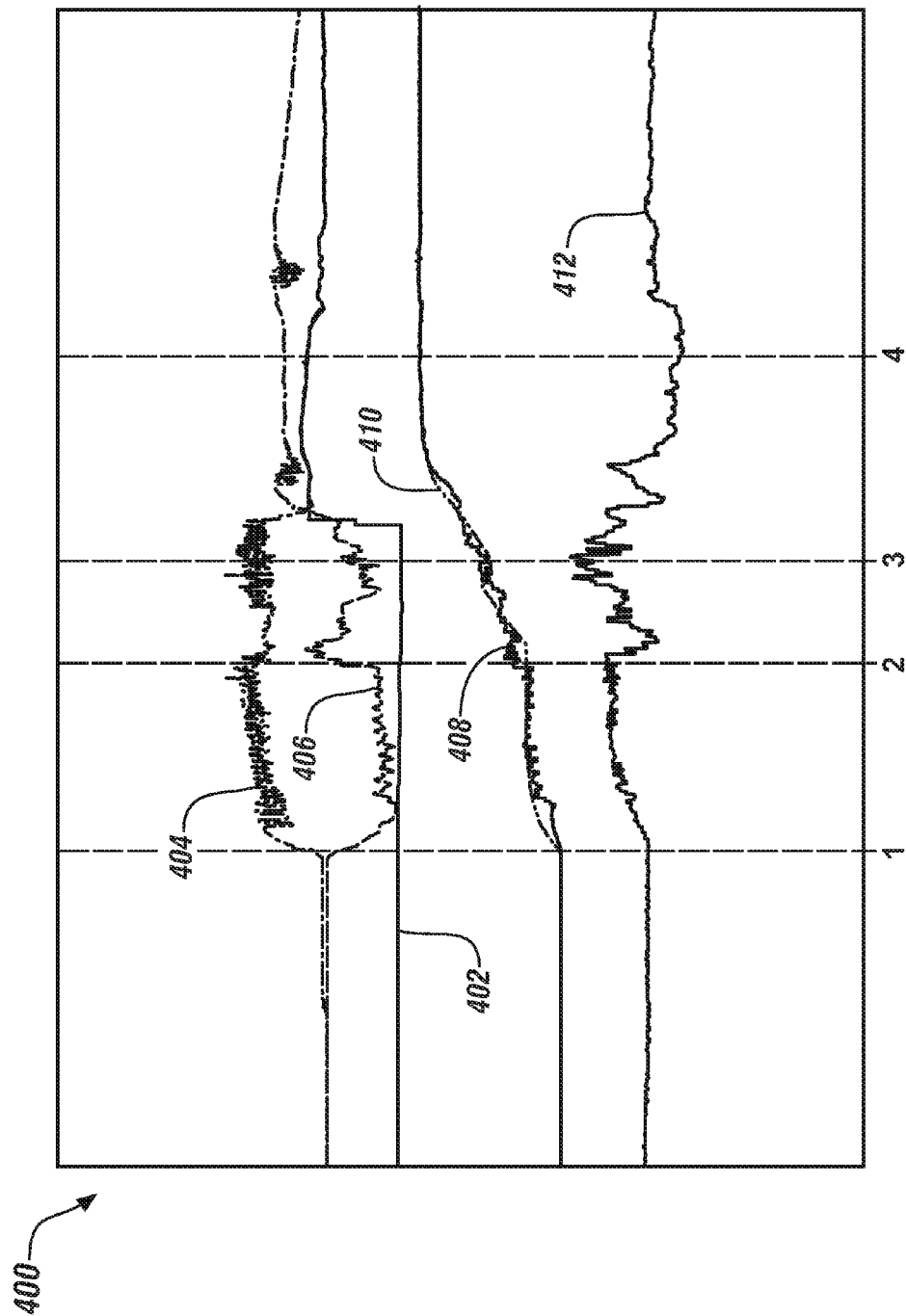
FIG. 4 illustrates profile lines for a first electric machine torque 406, a second electric machine torque 404, an internal combustion engine torque 402, the internal combustion engine speed 408, engine speed ramping 410 and electric power flow 412 into and out of an energy storage device in response to an engine start event during a cold start condition, in accordance with the present disclosure.

FIG. 4 illustrates profile lines for a first electric machine torque 406, a second electric machine torque 404, an internal combustion engine torque 402, the internal combustion engine speed 408, predetermined engine speed ramping 410 and electric power flow 412 into and out of an energy storage device in response to an engine start event for an exemplary vehicle during a cold start condition in accordance with an exemplary embodiment. The horizontal x-axis denotes time (seconds) and the vertical y-axis denotes torque (Nm), electric power (kW) and speed (RPM). In the exemplary embodiment, vehicle is started in ETC Mode 1 (see Table 1) by engaging the torque-transmitting mechanism C1 150 and additionally selectively engaging the torque-transmitting mechanism C5 158. At a point where dashed vertical line 1 intersects the engine speed and the engine speed ramping profile lines 408, 410, respectively, rotation of a crankshaft of the engine with at least one electric machine in accordance with a first ramping profile of the predetermined engine speed ramping profile 410 is initiated until a desired crank speed is achieved. An element of a planetary gear set (i.e., ring gear member 124) is selectively grounded by selectively engaging the torque-transmitting mechanism C5 158.

At vertical line 2, the engine speed 408 has achieved stabilization at the desired crank speed as denoted by the engine speed ramping profile 410 after completing the first ramping profile. Therefore, the engine is fired while controlling the engine speed 408 to maintain the desired crank speed. Subsequent to the engine firing, an engine flare condition is detected as denoted by the increase in the engine speed 408. In response to the engine flare condition, the engine speed ramping profile 410 is adjusted to a rate corresponding to an estimated rate at which the engine speed is increasing during the engine firing. As demonstrated by the engine speed ramping profile 410 between vertical lines 2 and 3, the desired crank speed is incrementally increased at the rate corresponding to the rate at which the engine speed 408 is estimated to be increasing do to combustion during the engine firing.

At vertical line 3, at least one predetermined combustion quality parameter is achieved. Here the engine speed 408 is controlled in accordance with a second ramping profile of the engine speed ramping profile 410 until a desired idle speed is achieved based on controlling combustion parameters of the engine. The desired idle speed is denoted when the engine speed ramping profile line 410 flattens as it approaches vertical line 4.

At vertical line 4, the element of the planetary gear set (i.e., ring gear member 124) is selectively un-grounded by selectively disengaging the torque-transmitting device C5 158. The engine start event is ended and the transmission can now operate under normal shift execution utilizing one of the operating range states illustrated in Table 1.

Figure 5:
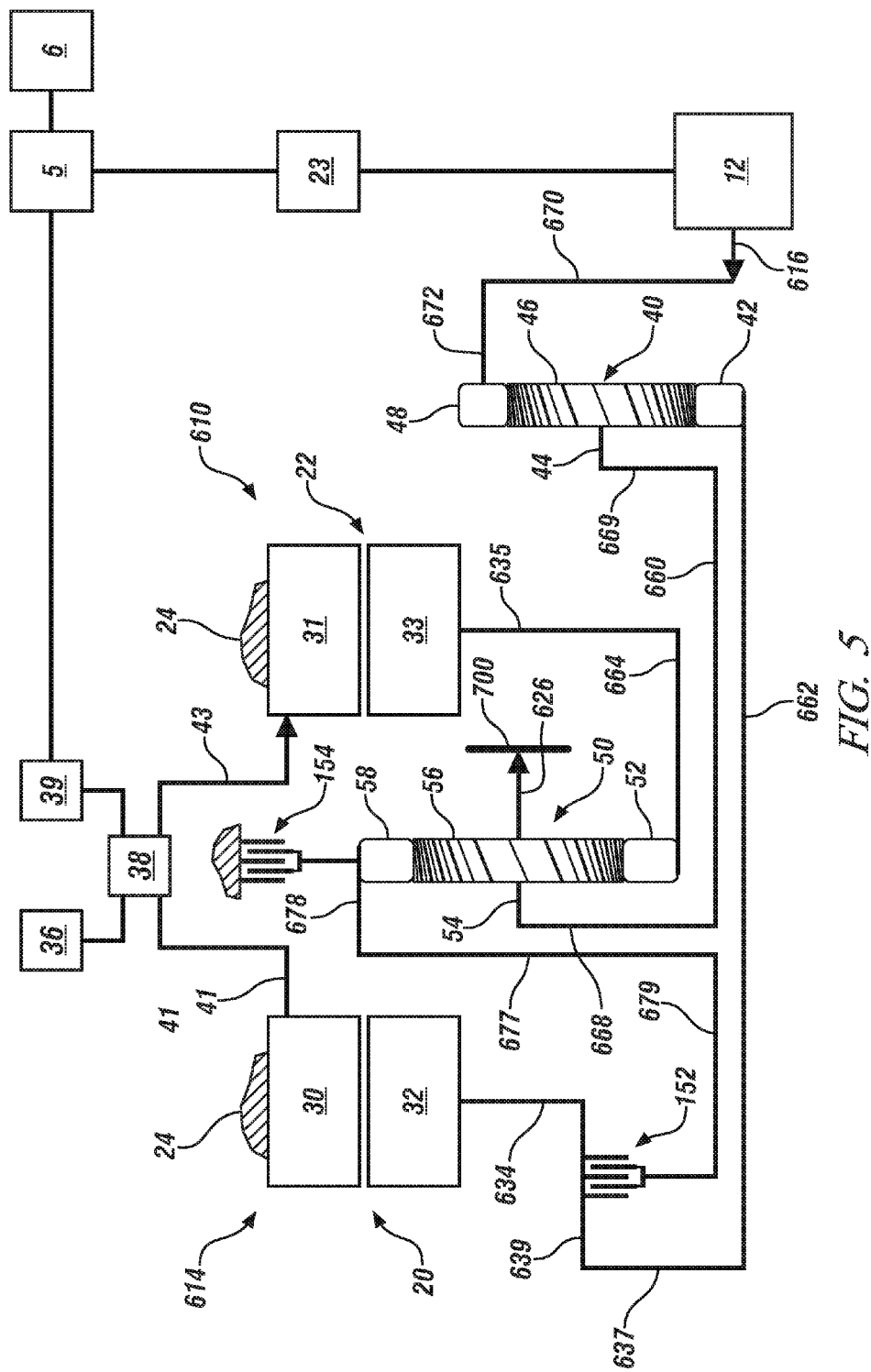
FIG. 5 illustrates an alternative hybrid powertrain having an internal combustion engine drivingly connected with an electro-mechanical transmission, in accordance with the present disclosure.

In an alternative embodiment, FIG. 5 illustrates a hybrid powertrain 610 having the internal combustion engine 12 drivingly connected with an electro-mechanical transmission 614. An output member of the engine 12 is connected for driving an input member 616 of the transmission 614. The exemplary flowchart of FIG. 3 can be utilized for starting the internal combustion engine 12 of the hybrid powertrain 610 of FIG. 5.

A first electric machine 20 and a second electric machine 22 are packaged within a case housing/ground 24 and are operatively connected between the input member 616 and a transmission output member 626 that reacts with a driveline 700. The first electric machine 20 includes an annular stator 30 grounded to the transmission casing 24, an annular rotor 32 supported on and for rotation with a rotatable rotor hub 634. A battery 36, power inverter 38 and electronic controller 39 are operatively connected with the stator 30 via transfer conductor 41 to control the functioning of the first electric machine 20 as a motor, in which stored electrical power is provided by the battery 36 to the stator 30, and a generator, in which torque of the rotating rotor 32 is converted to electrical power stored in the battery 36.

Similarly, the second electric machine 22 includes an annular stator 31 grounded to the transmission casing 24, an annular rotor 33 supported on a rotatable rotor rub 635. The battery 36, power inverter 38 and electronic controller 39 are operatively connected with the stator 31 via transfer conductor 43 to control the functioning of the second electric machine 22 as a motor and a generator.

The transmission 614 further includes first and second planetary gear sets 40, 50, respectively. Planetary gear set 40 has a first member that is a sun gear 42, a second member that is a carrier member 44 that rotatably supports a plurality of pinion gears 46 meshing with the sun gear 42, and a third member that is a ring gear 48 meshing with the pinion gears 46.

Planetary gear set 50 has a first member which is a sun gear 52, a second member that is a carrier member 54 that rotatably supports a plurality of pinion gears 56 meshing with the sun gear 52, and a third member that is a ring gear 58 meshing with the pinion gears 56. Rotor hub 635 is connected for rotation with the sun gear 52 by intermediate sleeve shaft 664.

The transmission 614 includes a first clutch 154 and a second clutch 152. The first clutch 154, also referred to as a grounding clutch or brake, is selectively activated to ground the ring gear member 58 to the transmission casing 24. The input member 616 is axially spaced from and not concentric with shaft 660, which couples the carrier member 44 of the first planetary gear set 40 and the carrier member 54 of the second planetary gear set 50. Shaft 662 is coaxial with the input member 616. Input member 616 couples to hub member 670 and axially-extending portion 672 to couple the input member 616 for common rotation with the ring gear 48. Shaft 662 couples rotor hub 634 with sun gear 42 via hub member 637 and an axially-extending portion 639. The second clutch 152 is nested between an axially extending portion 639, a hub 637 and a shaft. A hub member 674 is connected with the second clutch 152. A separate sleeve shaft 660 concentric with shaft 662 couples carrier member 54 and hub members 668 and 669 to carrier member 44. Sleeve shaft 664 couples rotor hub 635 with sun gear 52. Axially-extending member 678, hub 677 and axially-extending member 679, which is an annular shaft, couples the second clutch 152 with the first clutch 154 and ring gear 58. Axial-extending member 678 circumscribes the planetary gear set 50. It will be appreciated that the ring gear member 58 is decoupled from the sun gear member 42 when the second clutch 152 is deactivated.

The transmission 614 includes a first clutch 154 and a second clutch 152. The first clutch 154, also referred to as a grounding clutch or brake, is selectively activated to ground the ring gear member 58 to the transmission casing 24. The input member 616 is axially spaced from and not concentric with shaft 660, which couples the carrier member 44 of the first planetary gear set 40 and the carrier member 54 of the second planetary gear set 50. Shaft 662 is coaxial with the input member 616. Input member 616 couples to hub member 670 and axially-extending portion 672 to couple the input member 616 for common rotation with the ring gear 48. Shaft 662 couples rotor hub 634 with sun gear 42 via hub member 637 and an axially-extending portion 639. The second clutch 152 is nested between an axially extending portion 639, a hub 637 and a shaft. A hub member 674 is connected with the second clutch 152. A separate sleeve shaft 660 concentric with shaft 662 couples carrier member 54 and hub member 668 and 669 to carrier member 44. Sleeve shaft 664 couples rotor hub 635 with sun gear 52. Axially-extending member 678, hub 677 and axially-extending member 679, which is an annular shaft, couples the second clutch 152 with the first clutch 154 and ring gear 58. Axial-extending member 678 circumscribes the planetary gear set 50. It will be appreciated that the ring gear member 58 is decoupled from the sun gear member 42 when the second clutch 152 is deactivated.

As aforementioned, the exemplary flowchart of FIG. 3 can be utilized to start the engine 12 of the hybrid powertrain 610, including during engine start events. During block 304, an element (e.g., ring gear 58) of a planetary gear set (e.g., second planetary gear set 50) rotatably coupled to the crankshaft of the engine 12 is selectively grounded. During block 306, rotation of the crankshaft of the engine 12 is initiated with the at least one electric machine 20 and/or 22 in accordance with the first ramping profile until the first predetermined speed is achieved. The first clutch 154 is activated and the second clutch 156 is deactivated during the initiating rotation of the crankshaft of the engine 12, performed in block 306. In other words, and in an exemplary embodiment when the transmission 614 is configured for front-wheel drive operation, rotation of an element of a planetary gear set rotatably coupled to the crankshaft of the engine is forbidden immediately preceding the initiated rotation of the crankshaft of the engine with the at least one electric machine until the controlled engine speed in accordance with the second ramping profile achieves the desired idle speed. The first clutch 154 functions as a bypass clutch to bypass elements and members between the engine and the transmission to give a more direct coupling between the engine and the at least one electric machine 20 and/or 22. During block 316, the first clutch 154 is selectively disengaged to un-ground the ring gear member 58 (i.e., element of the planetary gear set), such that input member rotatably coupled with the ring gear 58 is no longer locked-up and permitted to rotate when the second predetermined speed (i.e., desired idle speed) is achieved.

An engine control module (ECM) 23 is operatively connected to the engine 12, and functions to acquire data from sensors and control actuators of the engine 12 over a plurality of discrete lines. The ECM 23 monitors an actual engine input torque, $T_I$, provided to the transmission 10 at that point in time based upon monitored engine speed and load, which is communicated to a hybrid control module (HCP) 5. The electronic controller 39 monitors a first motor torque of the first electric machine 20 and a second motor torque of the second electric machine 22. The HCP 5 provides supervisory control over the ECM 23 and the electronic controller 39 and a gear selector lever 6 which is operatively connected to receive inputs from a vehicle operator. The HCP 5 can further control activation and deactivation of the first and second clutches 154, 152, respectively.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to start operation of an internal combustion engine of a hybrid powertrain, the hybrid powertrain including the engine, an electrical energy storage device, an electro-mechanical transmission including at least one electric machine rotatably coupled to the engine, the electro-mechanical transmission selectively controllably operative to transmit torque among the engine and the at least one electric machine, comprising:

in response to an engine start event, initiating rotation of a crankshaft of the engine with the at least one electric machine in accordance with a first ramping profile until a first predetermined engine speed is achieved;

monitoring engine speed;

firing the engine while controlling the engine speed to maintain the first predetermined engine speed with the at least one electric machine;

adjusting the first ramping profile to a rate corresponding to an estimated rate at which the engine speed is increasing during the engine firing; and when at least one predetermined combustion quality parameter is achieved, controlling the engine speed in accordance with a second ramping profile until a second predetermined engine speed is achieved based on controlling combustion parameters of the engine.

2. The method of claim 1 wherein the engine start event occurs during a cold start condition when at least one of an engine coolant temperature is below a predetermined engine coolant temperature, an electrical energy storage device temperature is below a predetermined electrical energy storage device temperature and an electrical energy storage device state of charge is below a predetermined electrical energy storage device state of charge.

3. The method of claim 1 further comprising:

selectively grounding an element of a planetary gear set rotatably coupled to the crankshaft of the engine immediately preceding initiating rotation of the crankshaft of the engine with the at least one electric machine.

4. The method of claim 1 wherein adjusting the first ramping profile to the rate corresponding to the estimated rate at which the engine speed is increasing during the engine firing occurs only in response to the engine speed flaring above the first predetermined engine speed during the firing of the engine.

5. The method of claim 1 wherein adjusting the first ramping profile to the rate corresponding to the estimated rate at which the engine speed is increasing during the engine firing occurs only in response to an engine torque flaring above an engine torque flare threshold during the firing of the engine.

6. The method of claim 1 wherein the first and second ramping profiles are each based on an operating range of the electrical energy storage device, the operating range of the electrical energy storage device defined by a lower state of charge limit and an upper state of charge limit.

7. The method of claim 1 wherein controlling the engine speed in accordance with the second ramping profile until the second predetermined engine speed is achieved based on controlling combustion parameters of the engine further comprises reducing interaction from the at least one electric machine to the crankshaft of the engine based on a state of charge of the electrical energy storage device.

8. The method of claim 1 wherein controlling the engine speed in accordance with the second ramping profile until the second predetermined engine speed is achieved based on controlling combustion parameters of the engine further comprises maintaining interaction from the at least one electric machine to the crankshaft of the engine based on a state of charge of the electrical energy storage device.

9. The method of claim 1 wherein the predetermined combustion quality parameter comprises the engine speed achieving a combustion quality speed threshold that is greater than the first predetermined engine speed and less than the second predetermined engine speed.

10. The method of claim 1 wherein the predetermined combustion quality parameter comprises an engine torque achieving a combustion quality torque threshold.

11. The method of claim 1 wherein the predetermined combustion quality parameter comprises power flow into and out of the electrical energy storage device achieving a power flow threshold.

12. The method of claim 1 further comprising:
when the second predetermined engine speed is achieved, selectively un-grounding an element of a planetary gear set rotatably coupled to the crankshaft of the engine.

13. The method of claim 1 further comprising:
simultaneously fueling the engine during said initiating rotation of the crankshaft of the engine with the at least one electric machine.

14. Method to start operation of an internal combustion engine of a hybrid powertrain, the hybrid powertrain including the engine, an electrical energy storage device, an electro-mechanical transmission including at least one electric machine rotatably coupled to the engine, the electro-mechanical transmission selectively controllably operative to transmit torque among the engine and the at least one electric machine, comprising:
in response to an engine start event during a cold start condition, initiating rotation of a crankshaft of the engine with the at least one electric machine in accordance with a first ramping profile until a desired crankshaft speed is achieved;
monitoring engine speed;
monitoring power flow through the electrical energy storage device;
firing the engine while controlling the engine speed to maintain the desired crankshaft speed with the at least one electric machine;
monitoring engine torque;
in response to an engine flare condition, incrementally increasing the desired crankshaft speed at a rate corresponding to a rate at which the engine speed is estimated to be increasing due to engine combustion during the engine firing; and
when at least one predetermined combustion quality parameter is achieved, controlling the engine speed in accordance with a second ramping profile until a desired idle speed is achieved based on controlling combustion parameters of the engine.

15. The method of claim 14 wherein the at least one electric machine comprises a first electric machine and a second electric machine, each of the first and second electric machines rotatably coupled to the engine.

16. The method of claim 14 wherein the first and second ramping profiles are each constrained by an upper state of charge limit and a lower state of charge limit of the electrical energy storage device.

17. The method of claim 14 further comprising:
when the powertrain is configured for front-wheel drive operation, forbidding rotation of an element of a planetary gear set rotatably coupled to the crankshaft of the engine immediately preceding the initiated rotation of the crankshaft of the engine with the at least one electric machine until the controlled engine speed in accordance with the second ramping profile achieves the desired idle speed; and
when the powertrain is configured for rear-wheel drive operation, forbidding grounding of the element of a planetary gear set rotatably coupled to the crankshaft of the engine immediately preceding the initiated rotation of the crankshaft of the engine with the at least one electric machine until the controlled engine speed in accordance with the second ramping profile achieves the desired idle speed.

18. The method of claim 14 wherein the engine flare condition comprises at least one of:
the engine speed increasing above the desired crankshaft speed during the firing of the engine; and
the engine torque increasing above an engine torque flare threshold.

19. The method of claim 14 wherein the at least one predetermined combustion quality parameter is selected from the group consisting of: the engine speed achieving a combustion quality speed threshold; the engine torque achieving a combustion quality torque threshold; and power flow through the electrical energy storage device achieving a power flow threshold.

20. Apparatus to start an internal combustion engine, comprising:
a hybrid powertrain including the engine, an electrical energy storage device, an electro-mechanical transmission including at least one electric machine rotatably coupled to the engine, the electro-mechanical transmission selectively controllably operative to transmit torque among the engine and the at least one electric machine; and
a control module configured to:
initiate rotation of a crankshaft of the engine with the at least one electric machine in accordance with a first ramping profile until a first predetermined speed is achieved,
monitor engine speed,
fire the engine while controlling the engine speed to maintain the first predetermined speed with the at least one electric machine,
adjust the first ramping profile to a rate corresponding to an estimated rate at which the engine speed is increasing during the engine firing, and
when at least one predetermined combustion quality parameter is achieved, control the engine speed in accordance with a second ramping profile until a second predetermined speed is achieved based on controlling combustion parameters of the engine.

* * * * *